United States Patent [19]

Jones

[11] 4,121,140
[45] Oct. 17, 1978

[54] MOTOR CONTROL CIRCUIT

[75] Inventor: Melvin L. Jones, Irving, Tex.

[73] Assignee: Overhead Door Corporation, Dallas, Tex.

[21] Appl. No.: 774,256

[22] Filed: Mar. 4, 1977

[51] Int. Cl.² ............................................. H02P 1/44
[52] U.S. Cl. ........................... 318/221 R; 318/221 H; 318/473; 318/484; 361/114
[58] Field of Search ............ 318/207 B, 207 R, 221 R, 318/221 H, 446, 471–473, 484; 361/114

[56] References Cited

U.S. PATENT DOCUMENTS

| | | | |
|---|---|---|---|
| 3,087,102 | 4/1963 | Brown | 318/207 R |
| 3,903,456 | 9/1975 | Schaefer | 361/114 X |
| 3,993,940 | 11/1976 | Volk, Jr. | 318/207 B |
| 4,042,966 | 8/1977 | Newell et al. | 318/484 |

Primary Examiner—Gene Z. Rubinson
Attorney, Agent, or Firm—Blanchard, Flynn, Thiel, Boutell & Tanis

[57] ABSTRACT

A motor control circuit for preventing automatic restarting of an electric motor following an interruption of electric current flow therethrough. An electric motor incorporates winding means and a series automatic reset thermal overload protector. Current flow to the motor is normally controlled by current supply switch means in series with the motor across electric power input terminals. A first relay device is switched by external actuation of a normally open start switch to switch the current supply switch means to its conductive state for starting the motor. A second relay device connected across a pair of motor terminals is energizable in response to current flow through the motor. A restart prevention switch connects in series with the current supply switch and motor across the electric power terminals. The restart prevention switch is coupled to both the first and second relay devices and is controlled thereby for permitting current flow to the motor therethrough either while the start switch is being actuated, or while the motor is operating, the restart prevention switch otherwise being in its current blocking state.

7 Claims, 4 Drawing Figures

MOTOR CONTROL CIRCUIT

FIELD OF THE INVENTION

This invention relates to a motor control circuit, and more particularly to such a circuit for preventing automatic restarting of an electric motor following interruption of electric current flow therethrough.

BACKGROUND OF THE INVENTION

The present invention was developed in connection with motor control circuitry for motor driven door operators, for example of the kind usable for opening and closing garage doors. A persistent problem in this field, which insofar as I am aware has gone without satisfactory solution, is that of preventing automatic restarting of the door operator motor after a temporary interruption of energizing current flow through such motor. A typical electric door operator motor is reversible and incorporates a pair of windings connected at one end through a thermal overload protector to an external motor terminal and at their other, free ends to respective further motor terminals. A temporary break may occur in the path between motor windings and the electrical supply due to opening of the thermal overload protector in the motor. However, this is not the only possible cause for a temporary break in current supply to the motor windings. For example, a temporary power outage can occur at some location remote from the door, as due to storm damage to commercial power lines serving the door operating circuit. An automatic restarting of the motor, e.g., upon cooling of the thermal overload protector, restoration of the commercial power line, etc., may occur when least expected by the person using the door. Thus, unexpected restarting of door movement could damage persons or property in the path of the door. Thus, a restart prevention control incapable of preventing automatic restart after various types of temporary power interruption, or requiring extra or non-standard motor termination, is not satisfactory.

Accordingly, it is an object of this invention to provide:

A motor control circuit for preventing automatic restarting of an electric motor following an interruption of electric current flow therethrough.

A control circuit as aforesaid usable in a door operator circuit, as for garage doors.

A circuit as aforesaid usable with electric motors internally connecting an automatic reset thermal overload protector to the free ends of a pair of motor windings, in common, without availability of an external connection between said windings and protector.

A circuit as aforesaid capable of preventing automatic restarting of the motor not only in the event of a temporary motor shut-off by the motor thermal overload protector, but also due to other temporary interruptions of current to the motor including those due to conditions outside the motor, e.g., in power lines from a commercial power company.

A circuit as aforesaid which, after restoration of the thermal overload protector to its normal operating condition, or elimination of other causes of temporary current failure to the motor, will permit intentional reenergization of the motor in a convenient manner, as by actuation of the normal door operating switch, or start switch, without need for direct manual contact with the motor itself.

A circuit as aforesaid which can readily control additional and/or accessory devices, in concert with actual current flow through the motor, e.g., to operate a brake when and only when the motor is running.

A circuit as aforesaid wherein extra cost and structural complexity, occasioned by provision of automatic restart prevention, are minimized.

Other objects and purposes of this invention will be apparent to persons acquainted with apparatus of this general type upon reading the following specification and inspecting the accompanying drawings.

SUMMARY OF THE INVENTION

The objects and purposes of the invention are met by providing a motor control circuit for preventing automatic restarting of an electric motor following an interruption of electric current flow therethrough. An electric motor incorporates winding means and a series automatic reset thermal overload protector. Current flow to the motor is normally controlled by current supply switch means in series with the motor across electric power input terminals. A first relay device is switched by external actuation of a normally open start switch to switch the current supply switch means to its conductive state for starting the motor. A second relay device connected across a pair of motor terminals is energizable in response to current flow through the motor. A restart prevention switch connects in series with the current supply switch and motor across the electric power terminals. The restart prevention switch is coupled to both the first and second relay devices and is controlled thereby for permitting current flow to the motor therethrough either while the start switch is being actuated, or while the motor is operating, the restart prevention switch otherwise being in its current blocking state.

DETAILED DESCRIPTION

Figure 1:
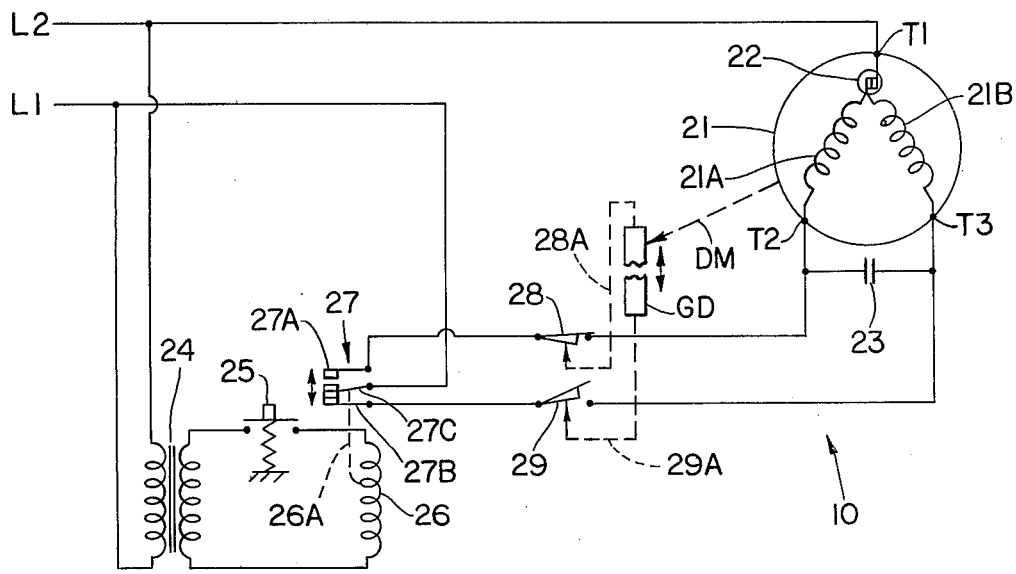
FIG. 1 is a circuit diagram of a door operator circuit without an automatic restart prevention capability.

FIG. 1 schematically discloses a garage door operator circuit, incorporating an electric motor 21. In the embodiment shown, the motor 21 is reversible and incorporates windings 21A and 21B. A thermal overload protector 22 comprises a pair of contacts which are normally closed, which open in response to overheating of the motor, and which automatically reset to the normal closed, current conductive condition shown when the overheated motor has sufficiently cooled. The protector 22 is hereafter referred to as an automatic reset thermal overload protector. Such a protector commonly couples one end each of the windings 21A and 21B to an externally accessible motor terminal T1. The remaining, free ends of the windings 21A and 21B connect to independent externally accessible motor terminals T2 and T3.

A capacitor 23 connects across the motor terminals T2 and T3 and provides the motor with sufficient starting and running torques. In operation, the capacitor 23 is in effect connected in series with motor winding 21A to provide for one direction of motor rotation and is connected in series with the other motor winding 21B to provide for the opposite direction of motor rotation.

For convenience in illustration, FIG. 1 also schematically shows a load to be driven by the motor, in this instance a garage door GD mechanically connected by any convenient drive means DM to the shaft (not shown) of the motor for raising and lowering thereby.

Conductive lines L1 and L2, connectible to any convenient power source, such as a 110 volt commercial power source, are respectively connected to a motor control switch 27 and to terminal T1 of the motor 21.

The motor control switch 27 here comprises a single-pole, double-throw switch having a movable contact 27C connected to aforementioned power line L1 and fixed contacts 27A and 27B alternatively selectible by movable contact 27C. Contacts 27A and 27B connect through limit switches 28 and 29, respectively, to motor terminals T2 and T3. In the example shown, the limit switches 28 and 29 may be (for example) conventionally positioned along the path of the door GD as to be opened by the door as it reaches its uppermost and lowermost positions, respectively, the interaction of door GD with limit switches 28 and 29 being here schematically indicated by the broken lines 28A ad 29A, respectively.

Switch 27 is here shown as part of a relay device and actuated by the coil, or solenoid, 26 thereof. Coil 26 is connected as part of a start circuit comprising a normally open push button switch 25, or the like, in series loop with the coil 26 and the secondary winding of an isolation, or step-down, transformer 24, the primary winding which connects across the power lines L1 and L2.

Elements 26 and 27 typically may be integrated in a common assembly which may be referred to as a ratchet, impulse or stepping relay. Such relay is here shown as an electromechanical device for purposes of illustration, wherein the drive connection between the coil 26 switch of movable element 27A is indicated by the broken line 26A. Such relay 26, 27 is so arranged that upon each energization of coil 26, the movable switch contact 27C will switch from one of the fixed contacts 27A and 27B to the other and upon a second energization of coil 26 movable contact 27C will switch back again to its original position. After contact 27C has switched to a new fixed contact, it will remain there for the remainder of period of energization of coil 26 and a following period of de-energization of such coil, and until such time as coil 26 is once again newly energized.

To briefly review the operation of the FIG. 1 apparatus, it will be initially assumed, for purposes of explanation, that the motor 21 has been run in a given direction and has been stopped by opening of the limit switch 29. In this condition coil 26 is de-energized and switch contact 27C engages fixed contact 27B. Momentary closure of the start switch 25 (e.g. by manual actuation of a conveniently located pushbutton or remote radio actuation or the like) energizes coil 26 from power lines L1 and L2 through transformer 24, and coil 26 in turn shifts switch contact 27C to the fixed contact 27A. This completes an operating current path from line L1 through switch contacts 27C and 27A, through closed limit switch 28 to the terminal T2 of motor 21. With the terminal overload protector 22 normally closed, and in view of connection of motor terminal T1 to remaining power line L2, the motor starts to run. As the motor is thus energized to start running, a voltage drop is developed across the capacitor 23.

In the FIG. 1 circuit, a temporary opening of the thermal overload protector 22, or a temporary disconnection or disabling of the power source connection to power lines L1 and L2, will stop current flow through the motor 21. In this way the motor 21 might stop at any time, e.g., intermediate in a door closing operation. Later elimination of such temporary disability (e.g. by reclosure of protector 22 or restoration of power to lines L1 and L2) will, as before, route current through the switch 27 and closed one of limit switches 28 and 29 through motor 21 causing same to start running again. This automatic restarting of the motor 21 (and corresponding movement of its load, here door GD) may occur at an entirely unexpected time and could perhaps result in injury to persons or property moved into the path of the load during the the temporary disabling of the motor 21.

Figure 2:
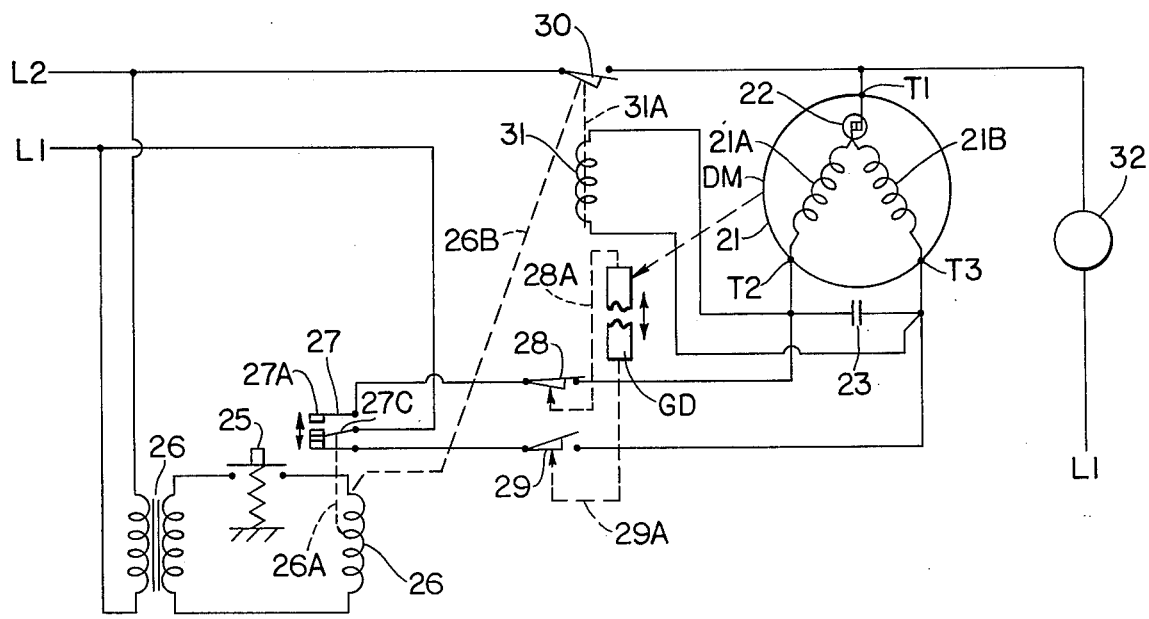
FIG. 2 is circuit diagram similar to FIG. 1 but modified to prevent automatic restarting of the motor following an interruption of current flow therethrough.

FIG. 2 more directly concerns the present invention and discloses the circuit of FIG. 1 with additional circuitry for preventing automatic restarting of the motor following the end of a temporary motor shut down of the type above discussed.

In FIG. 2, parts common to FIG. 1 carry the same reference numerals. Additionally in FIG. 2, a restart prevention switch 30 is connected in series with the motor 21 across the power lines L1 and L2. For illustration, the switch 30 is interposed in power line L2 connected to motor terminal T1. Alternatively, switch 30 can be connected in power line L1 in series with the central contact 27C of switch 27.

The switch 30 is of normally open type. The plunger of relay coil 26 is coupled, as indicated at 26B, to the switch 30 to close the switch 30 while the coil 26 is actuated. In this way, the switch 30 closes as the contact 27C is switched from one of the limit switches 28, 29 to the other to reverse the direction of the door GD, and the switch 30 stays closed for as long as the start switch 25 is held closed by the system user.

In addition, a further relay or solenoid coil 31 is connected across the motor terminals T2 and T3, and thus across capacitor 23. The plunger relay coil 31 is connected to switch 30 as schematically indicated at 31A, to close the switch 30 while the coil 31 is actuated by the voltage drop across capacitor 23 (or terminals T2, T3) resulting from operating current flow thrugh the motor 21. Though shown connected across capacitor 23, it is contemplated that the coil 31 can be connected to such other portions in the circuit as would energize the coil 31 when the motor 21 is actually in an energized state. For example, coil 31 could be connected in series with the motor 21, either in lines L1 or L2 or in parallel with either of motor windings 21A and 21B either directly or via other control components.

If desired, additional components, such as a brake intended to be operated only when the motor 21 is energized, and schematically indicated at 32, can be connected by the switch 30 across the power lines L1 and L2.

Operation of the FIG. 2 circuit is as above-described with respect to FIG. 1 so long as the switch 30 is held closed, by energization of coil 26 or coil 31.

More particularly, manual closure of the start switch 25 energizes coil 26 which closes the normally open switch 30 for the duration of switch 25 closure and also switches contact 27C from its position shown to establish a current path from line L1 through contacts 27C and 27A, closed limit switch 28, motor 21 and switch 30 to power line L2. Current flow through the motor is through winding 21A, as well as serially through capacitor 23 and winding 21B, and then through protector 22 to line L2. Thus, the motor runs. Due to the voltage drop across capacitor 23, current flows through coil 31 which, through connection 31A, 31B holds switch 30 closed permitting release of the start button 25 without influence on continued running of the motor 21.

The motor 21 will run in one direction when current is fed through closed limit switch 28 as immediately above-described. On the other hand, with limit switch 28 open, limit switch 29 closed and contact 27C in its alternative position as shown in FIG. 2, current flow would be through limit switch 29 and thence directly through winding 21B and serially through capacitor 23 and winding 21A, causing the motor to run in the opposite direction.

When the motor is run in a given direction, as determined by the position of switch 27, the motor will normally continue to run, until stopped by opening of the appropriate (then current carrying) limit switch 28 or 29 (provided switch 27 is not made to transfer to its other position). If the motor is running in either direction and current through the motor is interrupted, as by loss of input power at lines L1 or L2, or by opening of the thermal overload protector 22, the motor will stop.

Such cessation of current flow through the motor in turn eliminates the voltage drop across capacitor 23 (or terminals T2, T3) and de-energizes coil 31. Thus, and since coil 26 will normally not be energized at this point, switch 30 opens.

Thereafter, upon a subsequent restoration of electrical potential across lines L1 and L2, or upon restoration of the protector contacts 22 to their closed position shown, wherein the motor would ordinarily start automatically to run once again, automatic restart of the motor is positively precluded by the open condition of switch 30. Also, auxiliary components (schematically indicated at 32) which normally operate simultaneously with the motor 21, such as a light delay relay, an electrically operated brake, a motor running indicator, etc., will also be in an off condition at this point.

Thus, after elimination of the fault condition the motor will not automatically restart. Instead, restarting of the motor here requires manual actuation of start switch 25 to, as above-described, close switch 30 and thus permit operating current flow through the motor and operation thereof.

Thus, automatic restarting of the motor is precluded and manual intervention is instead required, thereby eliminating inadvertent injury to persons or property in the path of the load GD due to unexpected automatic movement thereof.

Figure 3:
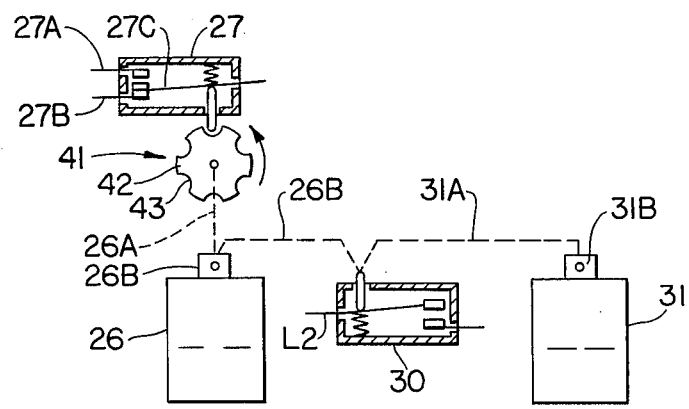
FIG. 3 discloses a first embodiment of mechanically interconnected components for providing automatic restart prevention.
Figure 4:
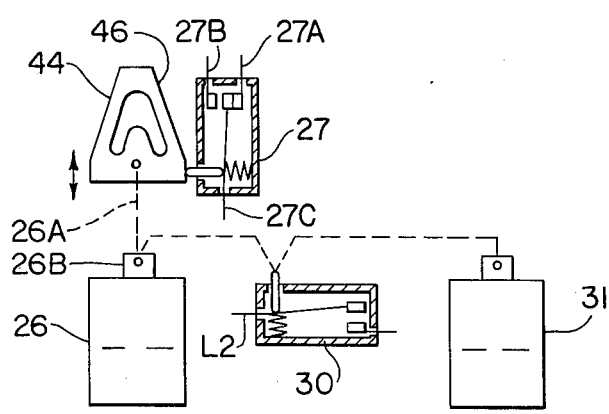
FIG. 4 discloses a second embodiment of mechanically interconnected components arranged for prevention of automatic restart.

FIGS. 3 and 4 illustrate specific mechanical interconnections of switches and solenoid plungers by which the present invention can be implemented.

Thus, in FIG. 3, the plunger 26B of solenoid 26, through any convenient connection 26A, angularly increments a rotatable cam 41 whose alternating teeth 42 and notches 43 alternatively press and release the spring-biased movable contact 27C of switch 27 to shift same between fixed contacts 27A and 27B. Suitable mechanical interconnection is also shown at 26B and 31A from the solenoid plunger 26B and the plunger 31B of solenoid 31, respectively to the actuator of switch 30 here shown as a spring-biased mechanical switch.

FIG. 4 is similar but in this instance employs a linear, rather than rotary, cam 44 mechanically coupled as schematically indicated at 26A' to the solenoid plunger 26B and in turn having a ramp 46 reciprocable to alternately depress and release the biased movable contact 27C of switch 27 for shifting same back and forth between its fixed contacts 27A and 27B.

Summarizing, if power to the motor is interrupted by a fault, as by loss of power input or by operation of the motor thermal overload protector 22, the motor 21 will not restart automatically upon elimination of such fault. To restart the motor instead requires an intentional act, here user actuation of start button 25. Relay device 26, when operated, repositions switch 27 from one of its fixed contacts to the other and also holds closed the switch 30 during the time of actuation of such relay device 26. Relay device 31, when energized, causes switch 30 to remain closed even if the relay device 26 is de-energized. Relay devices 26 and 31 are so interconnected with switch 30 that when both relay devices are de-energized, the switch 30 returns to its rest, open position shown. Actuation of switch 30 is usable not only to control operation of the motor 21, but for controlling other components 32 to operate simultaneously with the motor.

While this invention has been disclosed above in connection with a mechanical switch 30 mechanically controlled by relay or solenoid devices, variations, including electronic variations, are contemplated.

Although preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A motor control circuit for preventing automatic restarting of an electric motor following an interruption of electric current flow therethrough, comprising:
   electric power terminals energizable from an electric current source;
   an electric motor comprising, in series, winding means and an automatic reset thermal overload protector, said motor having terminals for electrical connection to said winding means and protector;
   a current supply switch means actuable to a state for serially connecting said motor winding means and protector across said electric power terminals;
   a start switch;
   a first switch control means associated with said current supply switch means and energizable by said start switch for switching said current supply switch means to said connecting state in response to actuation of said start switch;
   a second switch control means connected across a pair of said motor terminals for energization with said motor; and
   a common restart prevention switch connected in series with said current supply switch means and motor across said electric power terminals, and means connecting said common restart prevention switch to said first switch control means for closure thereby to permit current flow to said motor while said start switch is being actuated and also connecting said common restart prevention switch to said second switch control means for continuing and existing flow of current through said common switch to said motor, but for otherwise blocking current flow to said motor.

2. An electric motor control circuit usable with an electric motor having first and second reversing windings and an automatic reset thermal overload protector connected to said windings at one end thereof, such control circuit including first and second lines connectible to an electric power source, a first solenoid means having a motor feed contact actuable thereby for connectng a said motor winding through said protector across said first and second lines, and start means connectible with said first and second lines for actuating said first solenoid means to switch said motor feed contact to a position for flowing current to a said motor winding, wherein the improvement, for preventing automatic restarting of the motor following an interruption of electric current flow therethrough, comprises:

- a restart prevention switch connected in series with said motor in one of said first and second lins, said restart prevention switch having a normal open condition positively blocking all electric current flow through said lines to said motor to preclude motor restarting and being actuable to a closed condition permitting said current flow to the motor therethrough, said first solenoid means also being operatively connected with said restart prevention switch for closing same as said first solenoid means actuates said motor feed contact;
- a further solenoid means also operatively connected to said restart prevention switch and connected in circuit with said motor for holding said restart prevention switch closed for the duration for current flow through said motor regardless of the state of energization of said first solenoid means;
- whereby interruption of current flow through the said motor winding deactuates said further solenoid and, in the absence of manual actuation of said start means, said restart prevention switch prevents automatic restarting of said motor.

3. The apparatus of claim 2 in which said first and further solenoid means are both mechanically connected to said restart prevention switch.

4. The apparatus of claim 2 in which said motor is a reversible motor, said automatic reset thermal overload protector being connected to a first end of said motor windings, said motor feed contact comprising a two-position switch interposed between one of said power lines and said motor, the two fixed contacts of said two-position switch being connected respectively to the free ends of a capacitor connected across the free ends of said motor windings, said further solenoid means also being connected across said free ends of said motor windings, whereby current flow through either contact of said two-position switch and through said capacitor and motor windings provides energizing current flow through said further solenoid means as well.

5. The apparatus of claim 4 including a pair of limit switches each connected in a respective one of the conductive paths between a given one of said contacts of said two-position switch and the associated winding of said motor, said limit switches being associable with a load driven by said motor for sensing of forward and reverse limit positions reached thereby, to hold open one said limit switch with the load at said forward limit position and to hold open the other said limit switch with the load at said reverse limit position.

6. The apparatus of claim 4 including a start circuit connected across said first and second power lines and incorporating said start means and first solenoid means, said start means comprising a normally open start switch in series with the coil of said first-mentioned solenoid in said start circuit.

7. The apparatus of claim 4, including a start circuit connected across said first and second power lines and incorporating said start means and first mentioned solenoid, said start means comprising a normally open start switch means in series with the coil of said first mentioned solenoid in said start circuit for controlling normal starting of said motor and for restarting said motor after a fault condition has been corrected, including fault conditions such as interruption in restoration of electrical power or operation of said automatic reset thermal overload protector.

* * * * *

UNITED STATES PATENT AND TRADEMARK OFFICE
CERTIFICATE OF CORRECTION

PATENT NO. : 4 121 140
DATED : October 17, 1978
INVENTOR(S) : Melvin L. Jones

It is certified that error appears in the above-identified patent and that said Letters Patent are hereby corrected as shown below:

Column 7, line 2; change "continuing and existing" to ---continuing an existing---.

line 23; change "lins" to ---lines---.

line 37 change "duration for" to ---duration of---.

Column 8, lines 32,33; change "first-mentioned solenoid" to ---first solenoid means---.

lines 38,39; change "first-mentioned solenoid" to ---first solenoid means---.

line 42; change "interruption in restoration" to ---interruption and restoration---.

Signed and Sealed this

Second Day of January 1979

[SEAL]

Attest:

RUTH C. MASON
Attesting Officer

DONALD W. BANNER
Commissioner of Patents and Trademarks